(12) United States Patent
Werner et al.

(10) Patent No.: US 7,047,913 B2
(45) Date of Patent: May 23, 2006

(54) COOLING SYSTEM FOR A VEHICLE

(75) Inventors: Gerald Werner, Edingen-Neckarhausen (DE); Dierk Esau, Neulussheim (DE)

(73) Assignee: Deere & Company, Moline, IL (US)

( * ) Notice: Subject to any disclaimer, the term of this patent is extended or adjusted under 35 U.S.C. 154(b) by 78 days.

(21) Appl. No.: 10/778,819

(22) Filed: Feb. 13, 2004

(65) Prior Publication Data

US 2005/0178348 A1 Aug. 18, 2005

(51) Int. Cl.
*F01P 11/08* (2006.01)

(52) U.S. Cl. .............................. 123/41.33; 123/41.29; 123/563

(58) Field of Classification Search ............. 123/41.29, 123/41.31, 41.33, 196 AB, 563
See application file for complete search history.

(56) References Cited

U.S. PATENT DOCUMENTS

| 3,439,657 | A | * | 4/1969 | Gratzmuller | ............. 123/41.31 |
| 3,752,132 | A | * | 8/1973 | Bentz et al. | ................. 123/563 |
| 5,215,044 | A | * | 6/1993 | Banzhaf et al. | ........... 123/41.31 |
| 5,353,757 | A | * | 10/1994 | Susa et al. | ................ 123/41.31 |
| 5,394,854 | A | | 3/1995 | Edmaier et al. | ............ 123/563 |
| 5,598,705 | A | * | 2/1997 | Uzkan | .......................... 60/599 |
| 5,910,099 | A | * | 6/1999 | Jordan et al. | ............. 123/41.31 |
| 6,491,001 | B1 | * | 12/2002 | Dean et al. | ................ 123/41.31 |
| 6,758,266 | B1 | * | 7/2004 | Sjunnesson | ............... 123/41.33 |
| 2003/0127528 | A1 | * | 7/2003 | Sabhapathy et al. | ..... 237/12.3 B |

* cited by examiner

*Primary Examiner*—Noah P. Kamen

(57) ABSTRACT

A cooling system is provided for a vehicle with an internal combustion engine. The cooling system includes a high temperature cooling circuit and a low temperature cooling circuit that is separated from the high temperature cooling circuit. The high temperature cooling circuit cools the engine and includes at least one cooler. The low temperature cooling circuit cools an oil cooler and, if necessary, a charge air cooler and includes a cooler. The oil cooler may be connected with the high temperature cooling circuit so the oil temperature may be controlled within a narrow temperature range.

11 Claims, 3 Drawing Sheets

COOLING SYSTEM FOR A VEHICLE

BACKGROUND

This invention relates to a cooling system for a vehicle.

It is known to provide a vehicle having an internal combustion engine with a cooling system which includes a high temperature cooling circuit and a low temperature cooling circuit separated from the high temperature cooling circuit. The engine is cooled by a high temperature cooling circuit. The low temperature cooling circuit cools an oil cooler and, if necessary, a charge air cooler.

Such a known system is described in DE 41 14 704 A1. In this cooling system the engine has a charge air cooler and is cooled in the high temperature cooling circuit by means of the high temperature re-cooler. The coolant temperature in the high temperature cooling circuit is approximately 90 to 110° C. In the low temperature cooling circuit, which is separate from the high temperature cooling circuit, the charge air cooler, an engine oil cooler and a gearbox oil cooler are cooled by the low temperature re-cooler. The temperature of the coolant in the low temperature cooling circuit is approximately 45 to 90° C. The high temperature re-cooler and the low temperature re-cooler are both air-to-coolant heat exchangers and are referred to below as a cooler for the sake of simplicity.

With the cooling system of DE 41 14 704 A1, the charge air cooler is cooled by both cooling circuits. This cooling system includes an embodiment wherein the gearbox oil cooler is cooled along with the coolant from the high temperature cooling circuit together with the coolant from the low temperature cooling circuit in order to be able to remove large amounts of heat.

However, it is difficult for this known cooling system to directly and rapidly react to the momentary loads of the vehicle. While control valves are provided in the two cooling circuits for conducting the coolant past the individual coolers, nevertheless this cooling system cannot quickly react to sudden changes in the engine load quickly, and it cannot maintain an essentially constant oil temperature.

SUMMARY

Accordingly, an object of this invention is to provide a cooling system of the aforementioned type which overcomes the aforementioned problems.

A further object of the invention is to provide such a cooling system which controls the oil temperature within a narrow temperature range.

These and other objects are achieved by the present invention, wherein a cooling system has an oil cooler which can be connected with a high temperature cooling circuit.

Initially, the high temperature cooling circuit is configured separately from the low temperature cooling circuit, and the oil cooler is initially associated with the low temperature cooling circuit. A connection of the oil cooler to the high temperature cooling circuit is to be understood particularly in so far as in this operating condition the oil cooler is completely associated with the high temperature cooling circuit. Thereby the oil cooler can be heated or cooled by the high temperature cooling circuit. A change-over (or switching) operation of the oil cooler to the high temperature cooling circuit can be performed by means of a valve.

Connecting the oil cooler to the high temperature cooling circuit can quickly increase the oil temperature if the vehicle has been idling for a long period of time and the gearbox oil temperature has dropped below a predetermined value. If the oil temperature reaches a predetermined upper value, the oil cooler can be reconnected with the low temperature cooling circuit, in which case the cooling circuit change can be said to have been reversed.

Preferably, the oil cooler includes a engine oil cooler and/or a gearbox oil cooler. When the system includes a separate engine oil cooler and a separate gearbox oil cooler, it is advantageous to control the temperature of the engine oil independent of the temperature control of the gearbox oil.

Preferably, the oil cooler can be connected exclusively with the high temperature cooling circuit during the warm-up phase of the engine of the vehicle. This applies especially to the gearbox oil cooler, since hydraulic units, valves and clutches can then meet the predetermined reaction time, when the gearbox oil is at its optimum operating temperature. Preferably, in this operating condition the cooler of the high temperature cooling circuit can be separated from the high temperature cooling circuit, so that coolant of the high temperature cooling circuit that has not yet reached its operating temperature is not additionally cooled by the cooler. Thereby, in this vehicle operating condition the high temperature cooling circuit is used primarily for the warm-up of the components connected to it.

Preferably, the oil cooler has two parts, one part for connecting to the high temperature cooling circuit and another part for connecting to the low temperature cooling circuit. In this way it is possible to cool or warm the oil in a divided relationship of the oil cooler in a mixed temperature, for an even more flexible temperature control for an immediate operating condition of the vehicle.

Similarly, the charge air cooler could have two parts—one part for connecting to the high temperature cooling circuit and the other part for connecting to the low temperature cooling circuit. Thus, the engine charge air could be controlled flexibly to an optimum value as a function of the immediate load on the engine.

Preferably, both the high temperature cooling circuit and the low temperature cooling circuit include a coolant pump. Alternatively, the system could include a single coolant pump with separate pumping chambers, for isochronically pumping coolant through the two separate cooling circuits.

In a further embodiment, the oil cooler and/or the charge air cooler can be short circuited or can be separated from the high temperature cooling circuit and/or from the low temperature cooling circuit. A short circuit could be realized with a bypass connection. A valve arrangement could also be used to separate the oil cooler from the high temperature cooling circuit and/or the low temperature cooling circuit. The duration of the short circuit or the separation can be controlled to attain a desired increase of the oil temperature.

In a particularly preferred embodiment, the charge air cooler can be connected directly with the oil cooler when the engine is to be fully operational soon after a cold start. In this vehicle operating condition, the charge air cooler is one of the first units that is warmed by the compression of the charge air. This heat, however, can be conducted away over the direct connection to the oil cooler and used to heat the oil being conducted through the oil cooler. Thus, the oil can be brought to its operating temperature more rapidly to make systems fully operational after a cold start. Preferably, the cooler of the low temperature cooling circuit and/or the cooler of the high temperature cooling circuit can be separated from such a connection between the charge air cooler and the oil cooler. Correspondingly, in this operating condition there is no cooling in the sense that heat from the vehicle is transferred to the surrounding air. Rather there is a transport of heat from the charge air cooler to the oil cooler.

To attain a rapid interruption or connection of the oil cooler with the high temperature cooling circuit and/or the low temperature cooling circuit, the line connecting the engine, the oil cooler, if necessary, the charge air cooler, and/or the cooler of the high temperature cooling circuit and/or the cooler of the low temperature cooling circuit can be connected and/or interrupted by means of a valve. This valve or valves are preferably arranged in the cooling system to achieve the shortest possible line routing, but also to make possible a flexible access connection of the oil cooler to each of the cooling circuits. Such a valve could be provided with a thermostat and/or be configured so as to be controlled electrically or hydraulically. Finally, known electrically or hydraulically controlled valves may be used.

Preferably, a temperature sensor senses engine temperature at the location where the coolant of the high temperature cooling circuit leaves the engine. A further temperature sensor may sense the oil temperature of the oil flowing through the oil cooler. A temperature sensor could also sense the temperature of the charge air. The temperature sensor generates signals that are transmitted to an electronic control unit. The control unit compares the sensed temperature with a predetermined temperature or a predetermined temperature range and controls the valve or the valves and/or one or both coolant pumps correspondingly so that the predetermined temperature range or the predetermined temperature is maintained or are maintained.

A further cooling circuit may be provided for cooling of a part of the charge air cooler and/or the oil cooler. The further cooling circuit includes a cooling pump and a cooler and is separate from the high temperature cooling circuit and the low temperature cooling circuit.

The further cooling circuit cools the charge air cooler or the oil cooler down to an even lower temperature level to great advantage. The further cooling circuit is provided in addition to the high temperature cooling circuit and the low temperature cooling circuit if to increase the entire cooling performance of the cooling system to help meet future more restrictive exhaust emission requirements. The further cooling circuit can help increase cooling performance when insufficient space is available to enlarge the volume of the coolers of the high temperature cooling circuit or of the low temperature cooling circuit.

DETAILED DESCRIPTION

Figure 1:
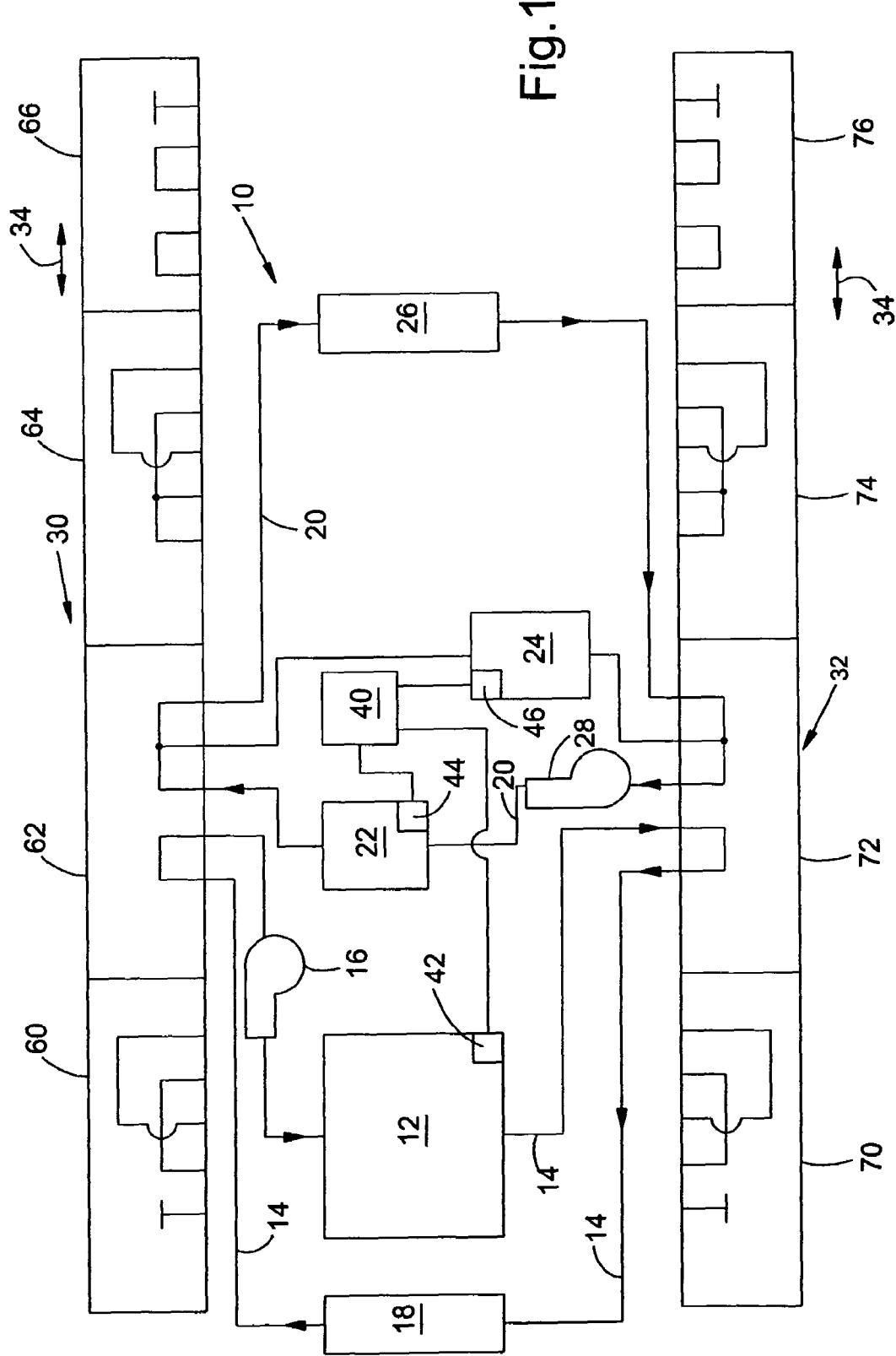
FIG. 1 is a schematic illustration of a first embodiment of a cooling system according to the invention.
Figure 2:
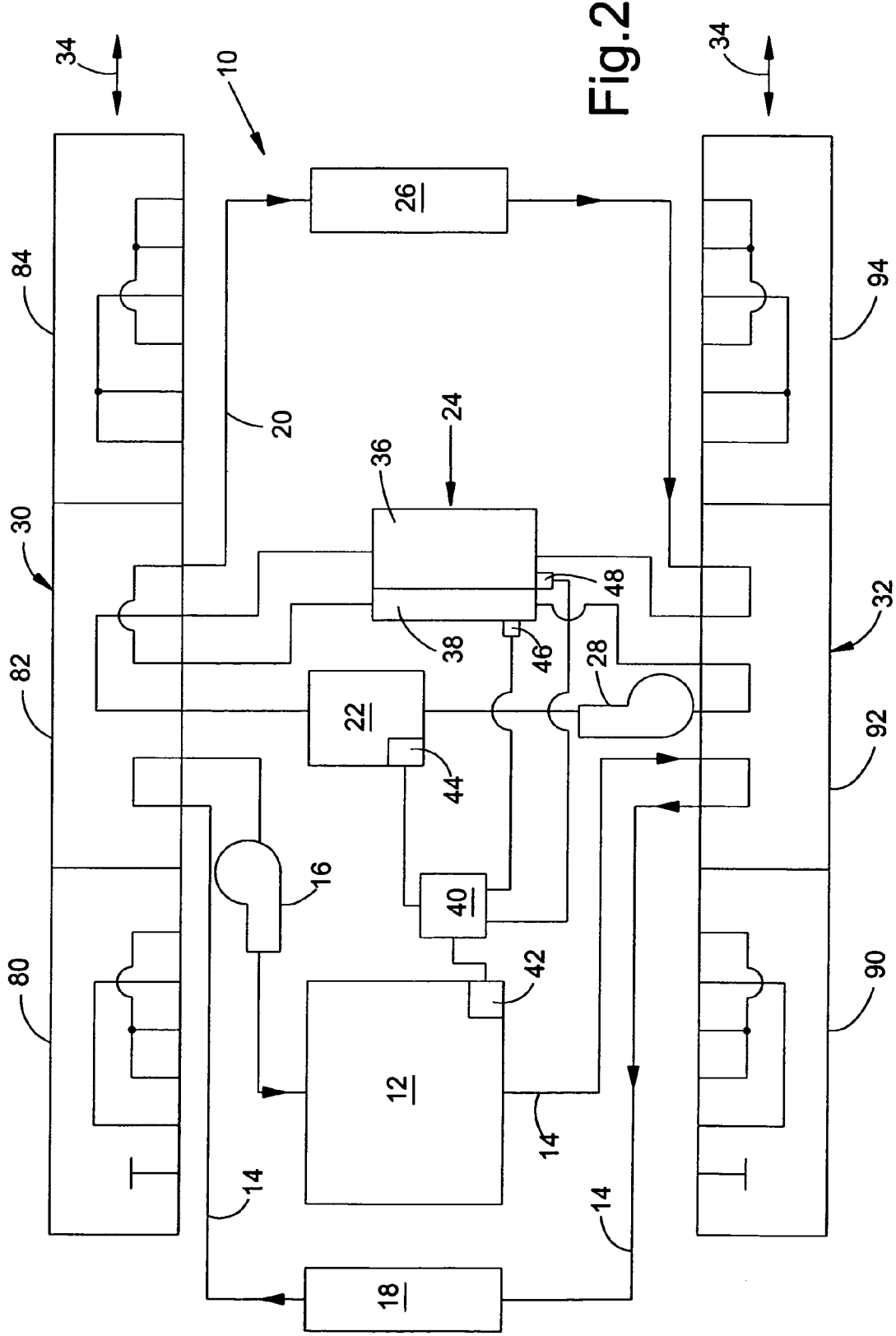
FIG. 2 is a schematic illustration of a second embodiment of a cooling system according to the invention.
Figure 3:
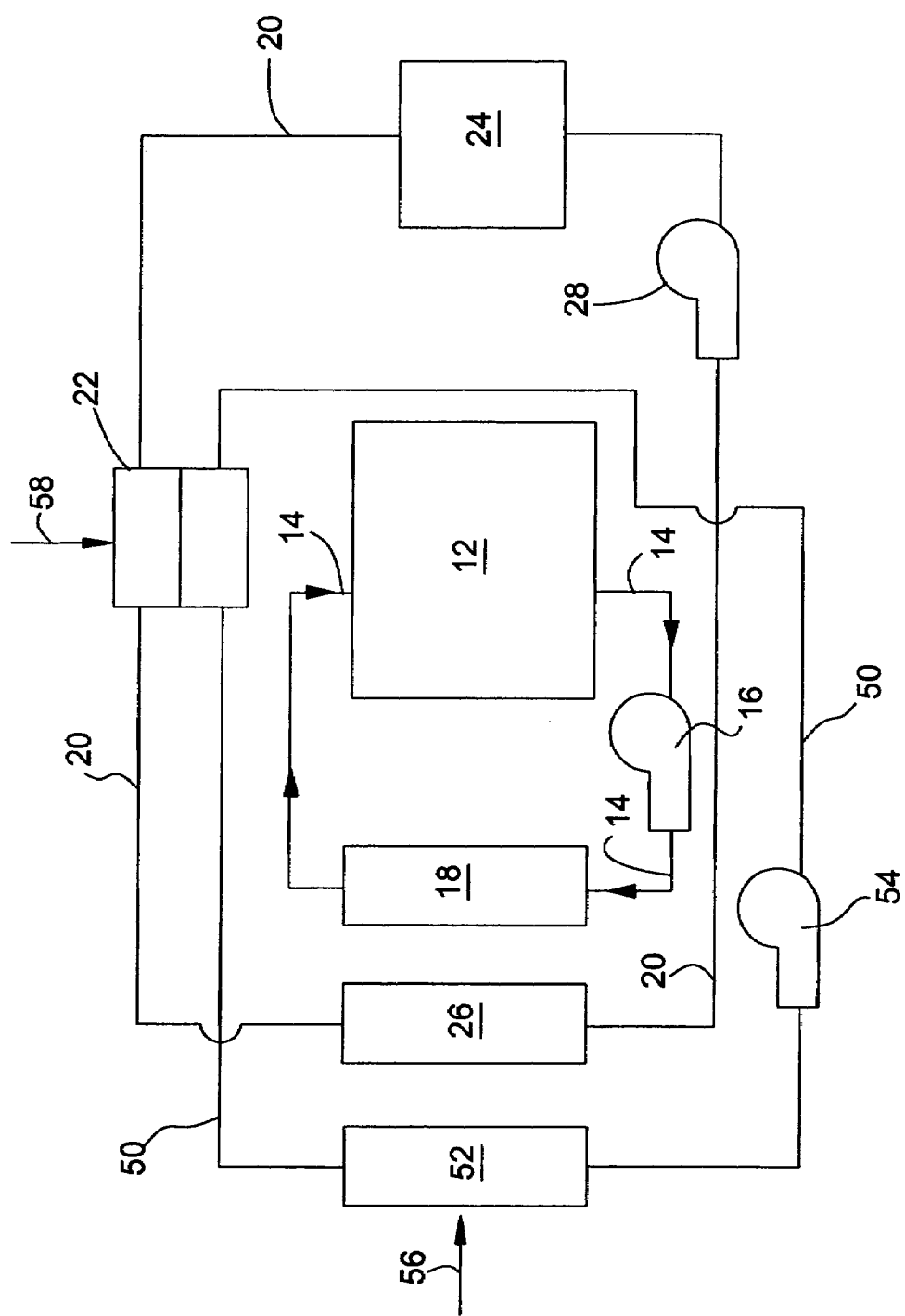
FIG. 3 is a schematic illustration of a third embodiment of a cooling system according to the invention.

FIG. 1 shows a cooling system 10 for a vehicle (not shown), such as an agricultural utility vehicle, in particular a tractor. In FIGS. 1 through 3 equivalent or similar components or groups of components are designated by the same part numbers. An internal combustion engine 12 is connected to a high temperature cooling circuit 14 of the cooling system 10. The high temperature cooling circuit 14 includes a coolant pump 16 and a cooler or radiator 18. A low temperature cooling circuit 20 includes a charge air cooler 22, an oil cooler 24, a cooler or radiator 26 and a coolant pump 28. The oil cooler 24 of FIGS. 1 and 2 preferably cools the gearbox oil from a vehicle gearbox (not shown).

The cooling system 10 includes valves 30, 32 for controlling communication between the individual components of the cooling system 10. The valves 30, 32 of FIG. 1 are 4 position, 5 way valves, while the valves 30, 32 of FIG. 2 are 3 position, 6 way valves. The valves 30, 32 are preferably electrically controlled. Preferably, in an actual cooling system 10 the valves 30, 32 could be replaced with several individual valves (not shown) arranged in different locations and the routing of the lines would be optimized, for example, with respect to their length.

Referring to FIG. 1, when valves 30, 32 are in active valve positions 62 and 72, respectively, the components of the high temperature cooling circuit 14 (the engine 12, the coolant pump 16 and the cooler 18) are connected with each other in a series circuit.

When valves 30, 32 are in positions 62 and 72, respectively, the components of the low temperature cooling circuit 20 (cooler 26, coolant pump 28, charge air cooler 22 and oil cooler 24) are connected with each other in such a way that the cooler 26 and the coolant pump 28 are connected to each other in a series circuit and the charge air cooler 22 and the oil cooler 24 are connected in parallel thereto. This condition of the cooling system 10 is useful when there is an average load on the engine 12 and hydraulic components (not shown).

With the cooling system 10 of FIG. 1, the oil cooler 24 can be connected with the high temperature cooling circuit 14 when valves 30, 32 are in positions 64 and 74 respectively. In this valve position the cooler 18 of the engine 12, the coolant pump 16 and the oil cooler 24 are connected in parallel where the coolant pump 16 is arranged downstream of the coolant flowing through the engine 12. In this valve position the charge air cooler 22, the cooler 26 and the coolant pump 28 of the low temperature cooling circuit 20 are connected in a series circuit. This operating condition of the cooling system 10 is preferably used when, for any reason whatever, the temperature of the oil flowing through the oil cooler 24 has dropped below a predetermined value and should be raised as rapidly as possible to a target temperature.

When valves 30, 32 are in positions 60 and 70, respectively, the engine 12, the coolant pump 16 and the oil cooler 24 are connected to each other in a high temperature cooling circuit 14. In this operating position the cooler 18 of the high temperature cooling circuit 14 is not active. In this operating position the low temperature cooling circuit 20 is formed by a series circuit of the cooler 26, the coolant pump 28 and the charge air cooler 22. This operating condition of the cooling system 10 is preferably used when the engine 12 is in its warm-up phase shortly after starting. In this operating position it is desirable that the oil cooled by the oil cooler 24 also reaches its normal operating temperature as rapidly as possible, so that the vehicle hydraulic components (not shown) can be operated or controlled reliably as soon as possible. For this purpose the engine 12, the coolant pump 16 and the oil cooler 24 are connected to each other in a series circuit, where the cooler 18 is separated from the high temperature cooling circuit 14. Thereby in this valve position the heat generated by the engine 12 is used to heat the oil flowing through the oil cooler 24.

When valves 30, 32 are in positions 66 and 76, respectively, the engine 12, the coolant pump 16 and the cooler 18 of the high temperature cooling circuit 14 are connected to each other in a series circuit. Furthermore, the charge air cooler 22 and the oil cooler 24 are connected to each other in a series circuit. In this valve position the cooler 26 is separated from the low temperature cooling circuit 20. Thereby, the charge air cooler 22 can be connected directly with the oil cooler 24. A coolant pump (not shown) is also provided in this valve position. This valve position is useful when the engine 12 and important vehicle devices are to be operational within a short time after a cold start.

Referring now to FIG. 2, the oil cooler 24 has a first larger part 36, that forms two-thirds of the oil cooler 24 and a second smaller part 38 that forms one-third of the oil cooler 24. The cooling system 10 includes two valves 30, 32 which can be moved in two directions as represented by the double arrows 34. Although not shown in FIG. 2, additionally or alternatively, the charge air cooler 22 may have two-parts, each for connecting to different cooling circuits.

When valves 30, 32 of FIG. 2 are in positions 82, 92, the high temperature cooling circuit 14 includes the engine 12, the coolant pump 16 and the cooler 18. In this valve position the low temperature cooling circuit 20 includes the cooler 26, the coolant pump 28, both parts 36, 38 of the oil cooler 24 as well as the charge air cooler 22. In this valve position all components of the low temperature cooling circuit 20 are connected to each other in a series circuit. This valve position corresponds to the vehicle being in a normal operating condition in which no transient load peaks occur.

When the valves 30, 32 are in position 84, 94, the smaller part 38 of the oil cooler 24 is connected with the high temperature cooling circuit 14. In this valve position the engine 12 and the coolant pump 16 are connected to each other in a series circuit, and the cooler 18 and the smaller part 38 of the oil cooler 24 are connected in a parallel circuit. The cooler 26 and the coolant pump 28 are in a series circuit with each other, while the charge air cooler 22 and the larger part 36 of the oil cooler 24 are connected in a parallel circuit. Thus, these four components form the low temperature cooling circuit 20. This valve position may be used in a vehicle operating condition wherein the temperature of oil flowing through the oil cooler 24 is slightly below a predetermined threshold value. Thus, to increase the temperature of the oil flowing through the oil cooler 24, the smaller part 36 of the oil cooler 24 is connected to the high temperature cooling circuit 14.

When valves 30, 32 are in positions 80, 90, the larger part 36 of the oil cooler 24 is connected in a series circuit with the engine 12 and the coolant pump 16, where then only these components form the high temperature cooling circuit 14. In this valve position the cooler 18 is inactive. In this valve position the cooler 26, the coolant pump 28, the smaller part 38 of the oil cooler 24 and the charge air cooler 22 form the low temperature cooling circuit 20. This valve position is for use when the engine 12 is started after an extended rest period and the oil flowing through the oil cooler 24 is to be raised rapidly to a desired operating temperature.

A control unit 40 controls the coolant pump 16, 28 and the valves 30, 32 of the cooling system 10. Temperature sensors 42, 44, 46 and 48 detect the operating temperature of the engine 12, the charge air cooler 22 and the oil cooler 24 and generate signals representing these temperatures. The temperature signals are transmitted to the control unit 40 which controls the valves 30, 32 and the coolant pumps 16, 28.

The control unit 40 preferably controls the cooling system 10 so that the engine 12, the charge air cooler 22 and the oil flowing through the oil cooler 24 is held to a predetermined temperature or within a predetermined temperature range. Thus, this cooling system can avoid or cause a temperature change of the devices 12, 22 or the oil flowing through the oil cooler 24 in response to short-term vehicle load changes.

FIG. 3 shows an actual operating condition of the cooling system with the valves omitted for clarity. In this operating condition, the engine 12, the coolant pump 16 and the cooler 18 are connected to each other in a series circuit and form the high temperature cooling circuit 14. The charge air cooler 22 has two-parts. The upper part of the charge air cooler 22, the oil cooler 24, the coolant pump 28 and the cooler 26 are connected to each other in a series circuit, and thereby form the low temperature cooling circuit 20. A further cooling circuit 50, for cooling the second part of the charge air cooler 22, includes a cooler or radiator 52 and a coolant pump 54. Cooling circuit 50 has the lowest temperature level. The coolers 52, 26 and 18 are arranged so that the air entering from the surroundings into the vehicle (in the direction of arrow 56) flows first through the cooler 52 of the further cooling circuit 50, then the cooler 26 of the low temperature cooling circuit 20 and finally the cooler 18 of the high temperature cooling circuit 14. Arrow 58 indicates the direction of flow of the air flowing through the charge air cooler 22. Correspondingly, the arrangement of the coolers 52, 26 and the connections of the low temperature cooling circuit 20 and the further cooling circuit 50 form a counter-flow heat exchanger with respect to the two-part charge air cooler 22.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A cooling system for a vehicle having an internal combustion engine, the cooling system comprising:
    a high temperature cooling circuit, the high temperature cooling circuit cooling the engine and including a first radiator;
    a low temperature cooling circuit, the low temperature cooling circuit including an oil cooler, a charge air cooler and including a second radiator; and
    a valve for controlling communication between the oil cooler and the high temperature cooling circuit, the valve being operable to connect the oil cooler exclusively with the high temperature cooling circuit and to disconnect the first radiator from the high temperature cooling circuit.

2. The cooling system according to claim 1, wherein:
    the oil cooler comprises an engine oil cooler.

3. The cooling system of claim 1, wherein:
    the oil cooler comprises first and second parts, the valve controlling communication between the first part, the second part, the high temperature cooling circuit, and the low temperature cooling circuit.

4. The cooling system of claim 1, wherein:
    the charge air cooler comprises first and second parts, the valve controlling communication between the first part, the second part, the high temperature cooling circuit, and the low temperature cooling circuit.

5. The cooling system of claim 1, wherein:
    each of the high temperature and low temperature cooling circuits includes a cooling pump.

6. The cooling system of claim 1, wherein:
    the charge air cooler is connected directly with the oil cooler; and the valve is operable to disconnect one of the radiators from the charge air cooler and the oil cooler.

7. The cooling system of claim 1, wherein:

the valve controls communication between the engine, the oil cooler, the charge air cooler and the first and second radiators.

8. The cooling system of claim 7, characterized by:

a temperature sensor for generating a coolant temperature signal; and a control unit for controlling the valve as a function of the coolant temperature signal.

9. The cooling system of claim 7, wherein:

each of the high temperature and low temperature cooling circuits includes a cooling pump;

a temperature sensor generates a coolant temperature signal; and a control unit controls the valve and the coolant pumps as a function of the coolant temperature signal.

10. The cooling system of claim 1, comprising:

a further cooling circuit for cooling at least one of the charge air and oil coolers, the further cooling circuit including a coolant pump and a third radiator.

11. The cooling system according to claim 1, wherein:

the oil cooler comprises a gearbox oil cooler.

\* \* \* \* \*